June 7, 1949.                    J. T. L. BROWN ET AL                    2,472,566
                                MOTOR CONTROL CIRCUIT
Filed May 16, 1945                                              3 Sheets-Sheet 1

J.T.L. BROWN
                              INVENTORS    C.E. POLLARD, JR.
                                       BY
                                           P. C. Smith
                                                  ATTORNEY June 7, 1949.                J. T. L. BROWN ET AL                2,472,566
                              MOTOR CONTROL CIRCUIT
Filed May 16, 1945                                           3 Sheets-Sheet 2
FIG.4.
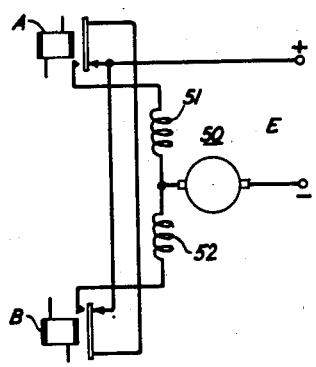
FIG.6.
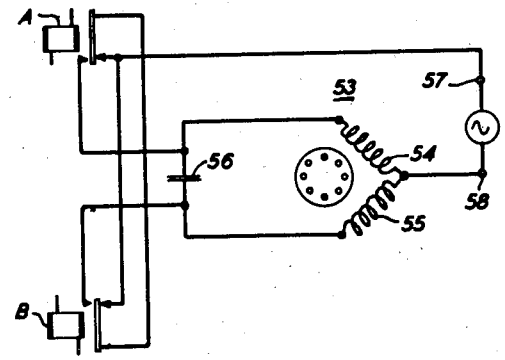
FIG.10.
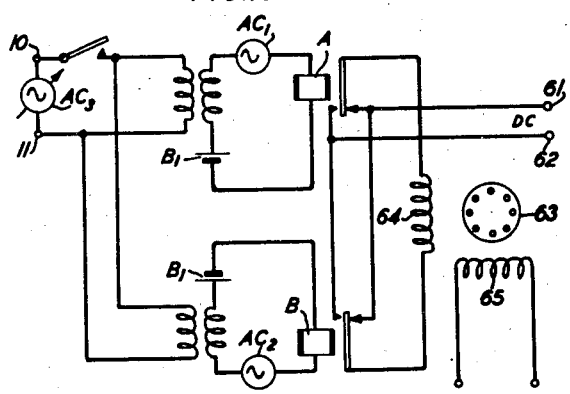
FIG.11.
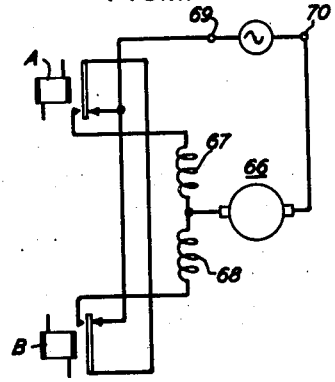
FIG.12A.     FIG.12B.     FIG.12C.
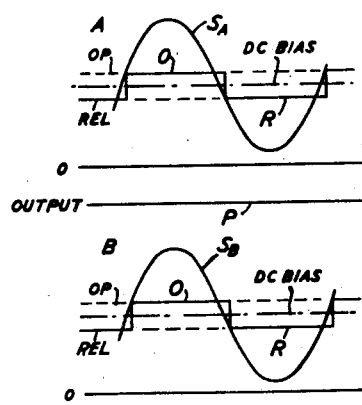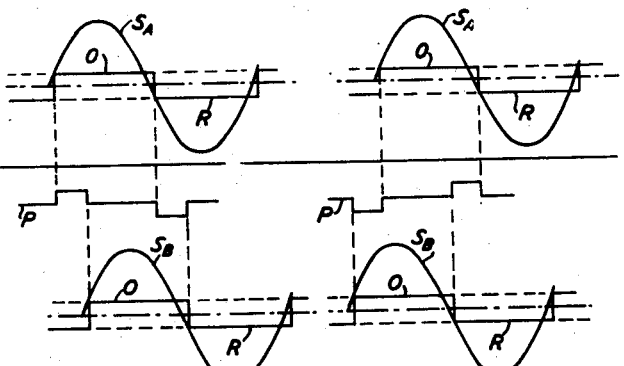
INVENTORS  J.T.L.BROWN
           C.E.POLLARD, JR.
BY         P. C. Smith
                    ATTORNEY INVENTORS J.T.L.BROWN
C.E.POLLARD,JR.
BY
P.C.Smith
ATTORNEY Patented June 7, 1949

2,472,566

UNITED STATES PATENT OFFICE 2,472,566

MOTOR CONTROL CIRCUIT

John T. L. Brown, Short Hills, and Charles E. Pollard, Jr., Hohokus, N. J., assignors to Bell Telephone Laboratories, Incorporated, New York, N. Y., a corporation of New York Application May 16, 1945, Serial No. 594,048

15 Claims. (Cl. 318—207)

This invention relates to an amplifier circuit and more particularly to a circuit in which relays are employed as active elements to produce an output in the form of variable width impulses having a useful component approximately proportional to an input which is variable in magnitude and duration.

An amplifier of this type is particularly useful for continuous control in driving a reversible load unit such as, for example, a direct or an alternating current motor.

It is therefore an object of the invention to provide an amplifier having relays as active elements thereof, which is simple in structure, reliable in operation and which has a large gain with a good output wattage.

It is a further object of the invention to provide an amplifier particularly adapted to the control of a motor which has smooth control of the motor through zero, good damping of the motor at zero signal and a zero power output by the relays at zero motor speeds.

The amplifier in accordance with the invention employs two relays. The contacts of the relays are connected between the power source and the load in such a way that, for the four possible combinations of operation and release of the two relays, two, E and F, correspond to an open circuit of the power source, one, G, corresponds to a direct connection between the power source and the load, and the fourth, H, corresponds to a reversed connection between the power source and the load.

The condition for zero output is obtained by having the two relays operating periodically and synchronously either in unison or alternation between conditions E and F. It is possible then to superimpose on the windings of the two relays a control current which will produce deviations from the synchronous condition. Making allowance for the time intervals required in transit between the released and operated positions, the effect of this control current will be the establishment of contact conditions G or H during intervals which increase with the amount of deviation produced, with consequent delivery of power to the load during these intervals.

If the control current is direct current, suitably poled in the two relays, all of the power pulses thus produced will be of type G. If the control current is then reversed all of the power pulses will be of type H. The duration of the power pulses will increase as the direct control current is increased up to the point where the relays remain continuously in condition G or H without operating or releasing. The total useful power delivered to the load will therefore increase as the direct control current is increased from zero. When the control current is reversed the useful power delivered corresponds to a reversed connection to the power source. This condition holds for a power source of any frequency from zero (direct current) up, the "useful" power being considered as limited to the component of the source frequency in the output power.

A somewhat similar deviation from the synchronous condition can be obtained by superimposing an isochronous alternating current to the windings, of such nature as to shift the phase of the total alternating current input to the windings, causing the operation of one relay to be advanced with respect to the other. This condition produces an alternate series of intervals of types G and H, the phase of which alternation with respect to the relay drive frequency is reversed when the phase difference in the relay drive is reversed. A direct current source of power can then be used to provide output power at the relay drive frequency or an alternating current power source at the relay drive frequency can be used to provide direct current output power.

If it is desired to operate an alternating current motor of the two-phase type one phase winding of which is energized from a first phase of an alternating current power source, the other phase winding is energized from a second phase of the power source in one or the other direction under the control of the relays. The duration of the impulses of the second phase transmitted through the second phase winding of the motor is then dependent upon the direction of the phase shift in the periods during which the relays are operated and the speed to which the motor attains is dependent upon the duration of the impulses transmitted to the motor by the relays. If the motor is of the split phase type, then the phase windings are selectively connected to a single phase source of alternating current under the control of the relays so that the motor will run in one direction or the other dependent upon which relay is operated and at a speed dependent upon the duration of the periods during which the relay is operated.

For a clearer understanding of the invention reference may be had to the following detailed description when read in connection with the accompanying drawings in which:

Fig. 4 shows schematically how a direct current motor of the series connected split field type may be controlled by the relays of the amplifier circuit;

Fig. 6 shows schematically how an alternating current motor of the split phase type may be controlled by the relays;

Figure 1:
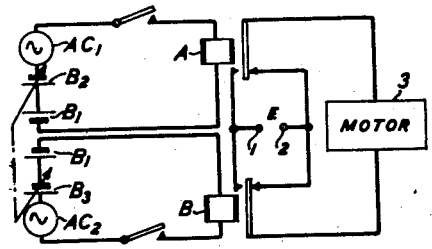
Fig. 1 shows a simplified form of the amplifier in accordance with the invention in which fixed direct current bias, fixed alternating current excitation and a variable direct current bias are supplied to the two relays.
Figure 8A:
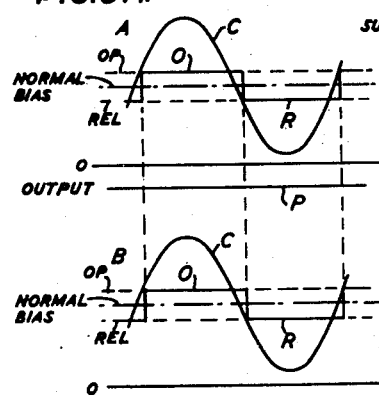
Figure 8B:
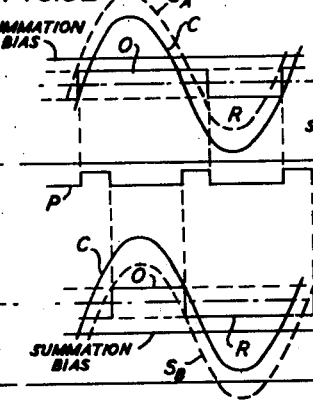
Figure 8C:
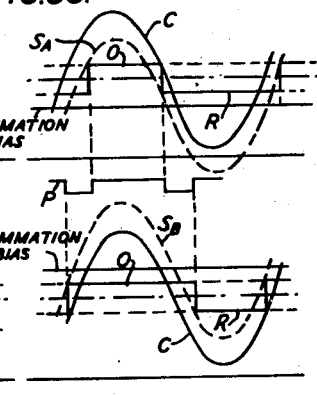

Figs. 8—A to 8—C show curves illustrating the operation of the circuit of Fig. 1;

Fig. 8—A showing showing the condition on zero signal;

Fig. 8—B showing the condition on a positive signal; and

Figure 2:
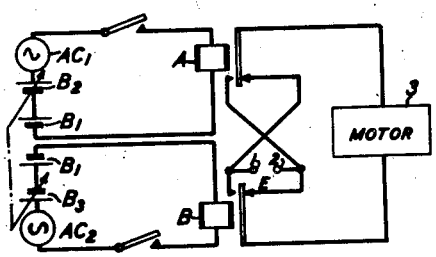
Fig. 2 shows a simplified alternative form of amplifier.
Figure 9A:
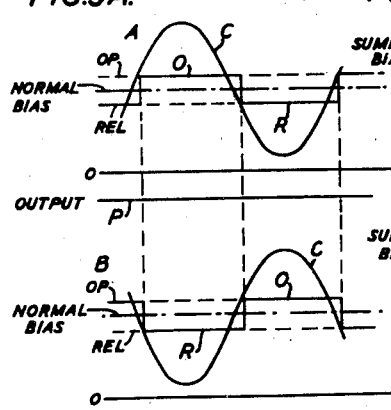
Figure 9B:
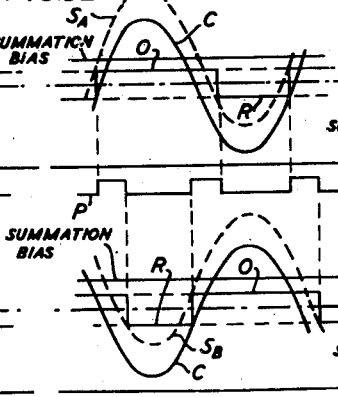
Figure 9C:
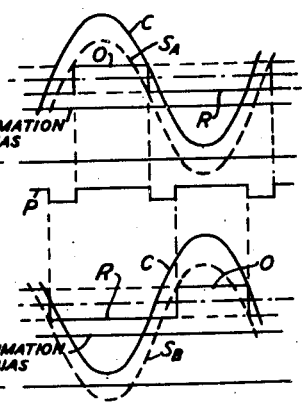

Fig. 8—C showing the condition on a negative signal;

Figs. 9—A to 9—C show curves illustrating the operation of the circuit of Fig. 2;

Fig. 9—A showing the condition on zero signal;

Fig. 9—B showing the condition on a positive signal; and

Fig. 9—C showing the condition on a negative signal;

Fig. 10 shows how a split phase alternating current motor may be operated from a direct current source under the control of the relays in response to a shifting of one phase of a two-phase alternating current signal source with respect to the other phase in accordance with a control signal;

Fig. 11 shows how a series-connected split field direct current motor may be operated from a source of alternating current under the control of relays controlled by circuits such as are shown in Fig. 10; and Figs. 12—A to 12—C show curves illustrating the operation of the circuits of Figs. 10 and 11;

Fig. 12—A showing the condition on zero signal;

Fig. 12—B showing the condition on a lagging of one phase of the signal source in respect to a control signal; and Fig. 12—C showing the condition on a leading of the phase of the signal source in response to a control signal.

Figure 7:
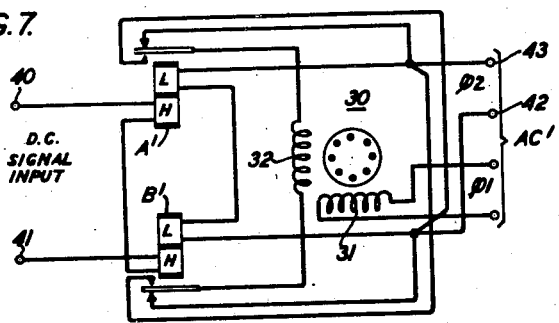
Fig. 7 shows one form of amplifier for controlling an alternating current motor.
Figure 5:
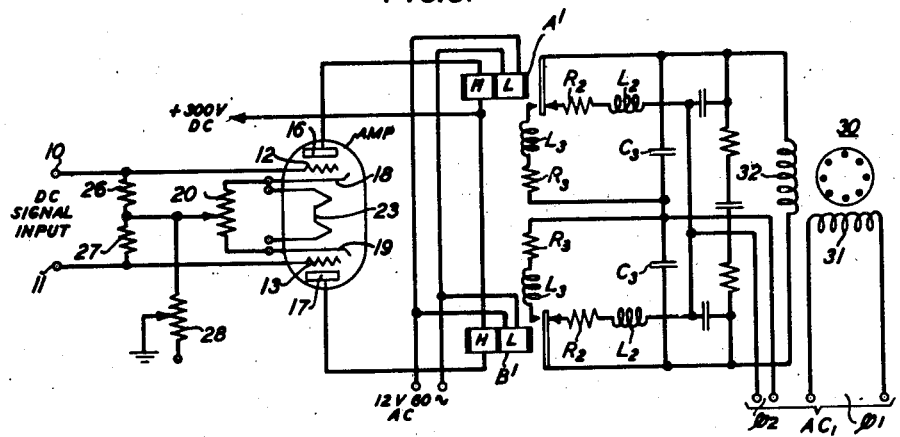
Fig. 5 shows an amplifier similar to that of Fig. 4 for controlling an alternating current motor.

The load controlling relays illustrated in the several figures of the drawing are preferably of the reed armature mercury contact type disclosed in the application of E. J. Burton, Serial No. 545,896, filed July 21, 1944, now Patent No. 2,445,406 patented July 20, 1948. It is to be understood, however, that relays of other types could be used if such relays are sensitive and fast in operation and capable of handling currents of considerable wattage transmitted over their contacts. Each of these relays comprises an envelope of glass or other suitable material through the bottom of which an armature terminal is sealed and through the top of which two other terminals are sealed. Secured to the inner end of one of the upper terminals is a front contact of magnetic material and secured to the inner end of the other upper terminal is a back contact of non-magnetic material. Secured to the lower terminal by a reed is an armature of magnetic material which is normally biased against the back contact and is attractable towards the front contact. A pool of mercury is placed in the bottom of the envelope from which mercury is conducted to the contacts by wick action. Surrounding the envelope is an operating coil or winding which, when energized, sets up a flow of magnetic flux through the armature and front contact to cause the movement of the armature toward the front contact. The relay as employed in the present invention is provided with two operating coils, one of 3300 ohms resistance and the other of 700 ohms resistance. In some instances as illustrated in Figs. 1, 2 and 4, these coils are connected in series to form a single coil whereas in other instances as illustrated in Figs. 5 and 7, the direct current bias is applied to the high resistance coil and the alternating exciting current is applied to the low resistance coil.

One of the simplest forms of the amplifier in accordance with our invention, in which relays are employed, is illustrated schematically in Fig. 1. The windings of relays A and B are excited by a fixed direct current bias from the battery $B_1$ and by a fixed alternating current excitation from the sources $AC_1$ and $AC_2$ in such a manner that with no input as represented by the variable direct current sources $B_2$ and $B_3$, the relays A and B operate and release in unison in accordance with the periodicity of the sources $AC_1$ and $AC_2$ and each relay spends just a half cycle, and the same half cycle, in its back contact closure position and the other half cycle in its front contact closure position.

With the source of power E connected between the terminals 1 and 2, then when both relays are in their back contact closure positions, both terminals of the motor 3 are connected to the same terminal 2 of the power source and when both relays are in their front contact closure positions, both terminals of the motor 3 are connected to the same terminal 1 of the power source. As a consequence the motor receives no power from the source E.

Now let an equal small direct current control signal be applied to the windings of the relays from the sources $B_2$ and $B_3$ so that one relay spends a little more than a half cycle in its front contact closure position, while the other relay spends a little more than a half cycle in its back contact closure position. If it be assumed that the control signal polarity is such that relay A is held for more than a half cycle in its front contact closure position while relay B is held for the same period in its back contact closure position, then a circuit will be established from terminal 1 of the source E over the front contact of relay A, through the motor 3 and over the back contact of relay B to terminal 2 of the source E. If the control signal polarity is reversed so that relay A is held for more than a half cycle in its back contact position while relay B is held for the same period in its front contact position, then a circuit will be established from terminal 1 of the source E, over the front contact of relay B through the motor 3 in the reverse direction and over the back contact of relay A to terminal 2 of relay E.

If symmetrical phase relations are maintained, the result is as illustrated by the curves of Fig. 8. The curves in the upper portion of this figure illustrate the response of relay A, the curves in the lower portion of this figure illustrate the response of relay B and the curves in the intermediate position illustrate the output current through the motor which results from the combined response of the two relays under different signal conditions. In each portion of this figure, the dot-dash line marked Normal bias illustrates the direct current fixed bias supplied from the battery $B_1$. The dotted line above the dot-dash line marked OP illustrates the current value at which the relay will operate, the dotted line below the dot-dash line marked REL illustrates the current value at which the relay will release, the full line curve C illustrates the summation of the direct current fixed bias and the alternating exciting current, the full line marked Summation bias illustrates the current value of the summation of the fixed bias and direct current control signal, the dotted curve represents the summation of direct current summation bias and the alternating exciting current, and the line O—R illustrates the operation and release response of the relay to the summation of the currents supplied to its winding. The curves P interposed between the upper and lower portions of Fig. 8 illustrate the values of the output current delivered under the joint control of relays A and B to the motor 3 from the source E.

Referring first to Fig. 8—A which illustrates the condition when no control signal current is applied from the batteries $B_2$ and $B_3$ to the relays A and B, the relay A operates when the summation current C from the alternating current source $AC_1$ and from the direct current source $B_1$ rises to a value equal to the operate value OP for the relay A and the relay releases when the summation current falls to a value equal to the release value REL for the relay A. Relay A will again operate when the summation current again rises to a value equal to the operate value OP for the relay. The sections O of the curve O—R now represent the periods during which relay A is operated and sections R represent the periods during which the relay is released.

Similarly relay B operates when the summation current C rises to a value equal to the operate value OP and releases when the summation current C falls to a value equal to the release value REL as illustrated in the lower portion of Fig. 8—A. The section O of the curve O—R shown in the lower portion of Fig. 8—A now represents the periods during which relay B is operated and sections R represent the periods during which the relay is released.

It will be noted that the O and R sections of the curve O—R are of equal length and that the corresponding O sections of the curves coincide in duration and amplitude and that also the corresponding R sections correspond in duration and amplitude. The net result is that the output current to the motor 3 is zero as represented by the line P.

It will now be assumed that the direct current control signal is changed so that the summation of the currents from the batteries $B_1$ and $B_2$ applied to relay A increases to the amount indicated by the line designated Summation bias in the upper portion of Fig. 8—B and that the summation of the currents from batteries $B_1$ and $B_3$ applied to relay B is decreased to the amount indicated by the line designated Summation bias in the lower portion of Fig. 8—B. As a result, the summation current through the winding of relay A increases as represented by the dotted curve $S_A$ shown in the upper portion of Fig. 8—B and the summation current through the winding of relay B decreases as represented by the dotted curve $S_B$ shown in the lower portion of Fig. 8—B. The portions O of curve O—R in the upper portion of Fig. 8—B now represent the periods during which relay A is operated and the portions R represent the periods during which relay A is released and similarly the portions O and R of the curve O—R in the lower portion of Fig. 8—B represent the periods during which relay B is operated and released, respectively. It is to be noted from the curves O—R that relay A now operates before relay B and releases later than relay B and consequently as disclosed by the curve P interposed between the upper and lower portions of Fig. 8—B two impulses of current are transmitted to the output circuit during each full cycle of the alternating exciting current, each of a duration measured by the amount of lead in the operating time of relay A over the operating time of relay B.

It will now be assumed that the direct current control signal is changed so that the summation of currents from the batteries $B_1$ and $B_2$ applied to relay A decreases to the amount indicated by the line designated Summation bias in the upper portion of Fig. 8—C and that the summation of the currents from batteries $B_1$ and $B_3$ applied to relay B is increased to an amount indicated by the line designated Summation bias in the lower portion of Fig. 8—B. As a result, the summation current through the winding of relay A decreases as represented by the dotted line $S_A$ shown in the upper portion of Fig. 8—C and the summation current through the relay of relay B increases as represented by the dotted line $S_B$ shown in the lower portion of Fig. 8—C. The portions O of curve O—R in Fig. 8—C now represent the periods during which relays A and B are operated and the portions R represent the periods during which the relays are released. It is to be noted from the curves O—R that relay B now operates before relay A and releases later than relay A and consequently, as disclosed by the curve P interposed between the upper and lower portions of Fig. 8—C, two impulses of current opposite in polarity to those transmitted under the conditions discussed in connection with Fig. 8—B are transmitted to the output circuit during each full wave cycle of the alternating exciting current, each of a duration measured by the amount of lead in the operating time of relay B over the operating time of relay A.

From the foregoing discussion of the circuit of Fig. 1 and the operational curves shown in Fig. 8, impulses are transmitted to the output circuit of the amplifier of a polarity which is dependent upon the direction of the change of the control signal from normal and of a duration dependent upon the magnitude of the control current.

It can easily be demonstrated in Fig. 8 that if sufficient control input is applied, the relays will lock up one in its front contact closure position and the other in its back contact closure position. The motor 3 is then connected to the power source E uninterruptedly and draws full power without mechanical or contact wear on the relays.

A circuit which is closely related to that of Fig. 1 is disclosed in Fig. 2. In this circuit the contacts, alternating current excitation polarity and control polarity on one relay, A, are reversed from those depicted in Fig. 1 with respect to relay A. For example, the poling batteries $B_2$ and $B_3$ with respect to the inner terminals of relays A and B are the same in Fig. 2 whereas they were opposite in Fig. 1, and the sources of alternating current $AC_1$ and $AC_2$ are oppositely poled with respect to the outer terminals of relays A and B whereas they were poled the same in Fig. 1. The connections from the terminals 1 and 2 of the power source E to the front and back contacts of relay A are shown reversed in Fig. 2. This circuit has the advantage of being controllable from the output of a single sided driver stage of tube amplification in which case the variable control current represented by the batteries $B_2$ and $B_3$ would be supplied by the anode current output of a single amplifier tube as contrasted with the circuit of Fig. 1, in which the separate control currents represented by the batteries $B_2$ and $B_3$ would be supplied by the plate current outputs of two amplifier tubes in the opposite sides of the driver stage. The circuit of Fig. 2, however, has the disadvantage that the differential alternating current excitation for the two relays would require an extra winding on each relay or an equivalent complication and the fixed bias and control current would be indistinguishable and the output would therefore be dependent on plate supply voltage, cathode temperature and the like of the driver stage of amplification.

The operation of the circuit of Fig. 2 under different signal input conditions is illustrated in Fig. 9, the various lines and curves having the same significance as the corresponding lines and curves of Fig. 8. Fig. 9—A illustrates the condition when no control signal current is applied from the batteries $B_2$ and $B_3$ to the relays A and B. Since the alternating current exciting currents applied to the two relays from the sources $AC_1$ and $AC_2$ are oppositely phased, relay A operates when the summation current of the alternating current from the source $AC_1$ and from the direct current source $B_1$, as illustrated by the curve C in the upper portion of Fig. 9—A, rises to the operate value OP for the relay A and relay A releases when the summation current falls to a value equal to the release value REL for such relay. Relay A will again operate when the summation current again rises to a value equal to the operate value OP. The sections O of the curve O—R now represent the periods during which relay A is operated and sections R represent the periods during which the relay is released. Similarly B operates when the summation current C rises to a value equal to the operate value OP and releases when the summation current falls to a value equal to the release value REL as illustrated in the lower portion of Fig. 9—A. The sections O of the curve O—R shown in the lower portion of Fig. 9—A represent the periods during which relay B is operated and sections R represent the periods during which relay B is released.

It will be noted that the O and R sections of the curves O—R are of equal length but that during the periods O of curve O—R when relay A is operated, relay B is released and vice versa. Consequently, no current will flow over the output circuit from the power source E to the motor 3 since power can flow to the motor only when both relays are operated or when both relays are released. The zero output condition is represented by the line P interposed between the two portions of Fig. 9—A.

It will now be assumed that the control signal is changed so that the summation of the currents from the batteries $B_1$ and $B_2$ applied to relay A increases to an amount indicated by the line designated Summation bias in the upper portion of Fig. 9—B and that the summation of the currents from batteries $B_1$ and $B_3$ applied to relay B is increased to a like degree as indicated by the line designated Summation bias in the lower portion of Fig. 9—B. As a result the summation current through the winding of relay A increases as represented by the dotted line $S_A$ shown in the upper portion of Fig. 9—B and the summation current through the winding of relay B also increases as represented by the dotted line $S_B$ shown in the lower portion of Fig. 9—B. However, these summation currents are 180 degrees apart in phase so that when relay A is operated, as represented by the sections O of the curve O—R in the upper portion of Fig. 9—B, relay B is released as represented by the sections R of the curve O—R in the lower portion of Fig. 9—B. There will, however, be an interval after relay A operates during each positive half cycle of its summation current $S_A$ and before the relay B releases on the corresponding negative half cycle of its summation current $S_B$ that both relays will be operated and an impulse therefore transmitted from the source E over the output circuit to the motor 3. Also near the beginning of each negative half cycle of the summation current $S_A$, while relay A is still energized, relay B will again operate near the beginning of the corresponding positive half cycle of its summation current $S_B$ so that both relays will again be operated and an impulse therefore transmitted from the source E to the motor 3. These impulses are represented by the curve P shown interposed between the upper and lower portions of Fig. 9—B.

If now the polarity of the signal input is changed so that the summation of the currents from the batteries $B_1$ and $B_2$ applied to relay A decreases below the normal bias condition represented by the line designated Summation bias in the upper portion of Fig. 9—C and the summation of the currents from the batteries $B_1$ and $B_3$ applied to relay B, be also decreased a like amount as indicated by the line designated Summation bias in the lower portion of Fig. 9—C, the summation currents will result as illustrated by the dotted lines $S_A$ and $S_B$ in the two portions of the figure. Again these summation currents are 180 degrees apart in phase so that when relay A is operated as represented by the sections O of the curve O—R, in the upper portion of Fig. 9—C, relay B is released as represented by the section R of the curve O—R in the lower portion of Fig. 9—C. There will, however, be an interval immediately following the release of relay B near the end of each positive half cycle of its summation current $S_B$ and before relay A operates near the beginning of the succeeding positive half cycle of its summation current $S_A$ and a second interval following the release of relay A near the end of each positive half cycle of the summation current $S_A$ and before relay B operates near the beginning of the subsequent positive half cycle of its summation current $S_B$, when both relays A and B will be released and impulses will be transmitted from the source E over the output circuit to the motor 3. These impulses will be of opposite polarity to those transmitted to the motor under the conditions assumed in the discussion of Fig. 9—B and are represented by the curve P shown interposed between the upper and lower portions of Fig. 9—C.

Figure 3:
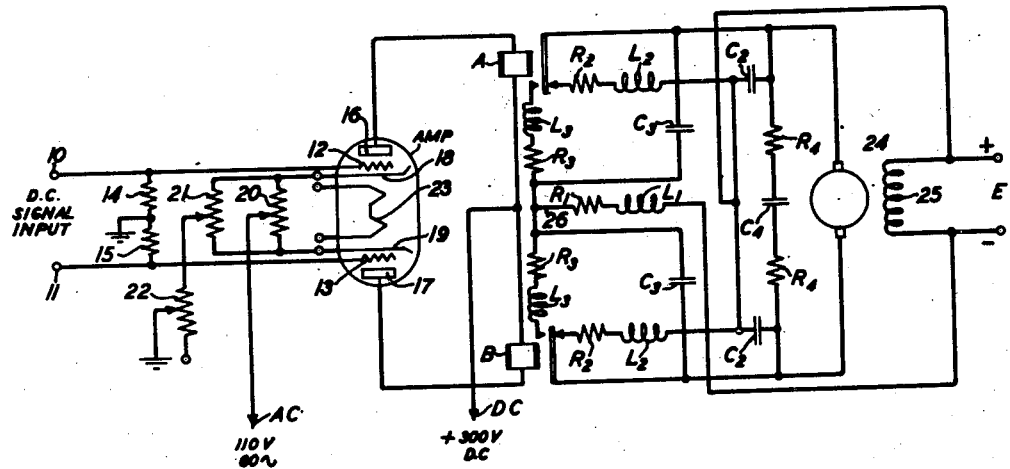
Fig. 3 shows an amplifier having one stage of direct current signal amplification for controlling a shunt field direct current motor.

A practical application of the fundamental circuit of Fig. 1 is shown in Fig. 3 for controlling a direct current motor of the shunt field type. In this circuit a direct current signal input is applied between the input terminals 10 and 11 and from such terminals is applied to the control grids 12 and 13 of the dual amplifier tube AMP. The grids of this tube are also connected through equal resistances 14 and 15 to ground and the plates 16 and 17 are connected respectively through the windings of relays A and B to a source DC of positive direct current which may, for example, have a potential of 300 volts. The cathodes 18 and 19 are interconnected by the windings of two rheostats 20 and 21, the slider of rheostat 20 being connected to a source AC of 110 volt, 60 cycle alternating current and the slider of rheostat 21 being connected through the rheostat 22 to ground. By adjusting the rheostats 20 and 21, the balanced condition of the two units of the tube may be secured when no signal input is present between the terminals 10 and 11. The filaments 23 of the tube may be heated in the usual manner. The two units of tube AMP are thus connected in a push-pull arrangement with respect to the terminals 10 and 11 and to the relays A and B.

The motor 24, of the separately excited shunt field type, has its field winding 25 energized from the power source E, which in this case is direct current, and has its armature circuit connected between the swing contacts of relays A and B. The back contact of each relay is connected through a resistance $R_2$ and an impedance $L_2$ to the same terminal of the source E and the front contact of each relay is connected through a resistance $R_3$ and an impedance $L_3$ to a common conductor 26 and thence through the resistance $R_1$ and impedance $L_1$ to the other terminal of the source E. For contact protection a condenser $C_3$ is also bridged through a resistance $R_3$ and an impedance $L_3$ across the front and swing contacts of each relay and the condenser $C_2$ is likewise bridged through a resistance $R_2$ and an impedance $L_2$ across the back and swing contacts of each relay. The motor armature circuit is also shunted by resistance $R_4$ and condenser $C_4$ connected in series. With no signal present both units of tube AMP are conducting to an equal degree and alternating exciting current is applied from the source AC to the slider of rheostat 20, thence over the cathode-plate circuits of the tube through the windings of relays A and B and to the direct current source DC. The source DC supplies a normal fixed biasing current for the relays and in response to the alternating current summation currents of the character shown by curve C of Fig. 8—A are applied to the windings of relays A and B and such relays operate together during each positive half cycle of the summation currents and release together during each negative half cycle of the summation currents. As a consequence, the vibrating action of relays A and B is ineffective to connect current from the source E through the motor armature circuit and the motor does not operate.

If, however, a direct current signal input is applied across the input terminals 10 and 11, so that the grid of one unit of tube AMP becomes more positive with respect to the cathode of such tube and the grid of the second unit becomes less positive, the first unit will be rendered more conducting and the second unit will be rendered less conducting. If, for example, it be assumed that the upper unit of tube AMP becomes more conducting the direct current component of the current applied through the winding of relay A increases and the direct current component of the current applied through the winding of relay B decreases in the manner illustrated in Fig. 8—B with the result that twice during each positive half cycle of the alternating current source, an impulse of current is transmitted through the armature circuit of motor 24 over a circuit from the + terminal of the source E through impedance $L_2$, resistance $R_2$, over the back contact of relay B, through the motor armature, over the front contact of relay A, through impedance $L_3$, resistance $R_3$ through resistance $R_1$ and impedance $L_1$ to the — terminal of the source E. Each of these impulses will be of a duration which is proportional to the magnitude of the signal input applied between terminals 10 and 11. With the motor field 25 separately excited from the source E, the motor now runs in a direction determined by the polarity of the input signal and at a speed proportional to the magnitude of the signal.

Had the signal input been of the opposite polarity so that the lower unit of tube AMP became more conductive and the upper unit less conductive, then the direct current component of the current applied through the winding of relay B would increase and the direct current component of the current applied through the winding of relay A would decrease as illustrated in Fig. 8—C, with the result that twice during each positive half cycle, an impulse of current would be transmitted from the + terminal of the source E through impedance $L_2$, resistance $R_2$, over the back contact of relay A through the motor armature, over the front contact of relay B, through impedance $L_3$, resistance $R_3$, resistance $R_1$ and impedance $L_1$ to the — terminal of source E. Each of these impulses will be of a duration which is proportional to the magnitude of the signal input and in a direction opposite to that previously discussed so that the motor would run in the opposite direction at a speed proportional to the magnitude of the input signal.

Relays of the mercury contact type such as is disclosed in the application of E. T. Burton hereinbefore referred to have been found to function very satisfactory in circuits of the type just described, but since these relays have a contact continuity during the period that the swing contact passes from the back to the front contact closure position and vice versa, which may be of several milliseconds duration, the resistance $R_1$ and impedance $L_1$ are provided to prevent the full short circuit of the power source E during such transfer operations. The other resistances $R_2$ and $R_3$, impedances $L_2$ and $L_3$ and condensers $C_2$ and $C_3$ provide protection to the contacts of the relays in the manner fully described in such application.

Fig. 4 shows a further application of the fundamental circuit of Fig. 1 to the control of a direct current motor of the series-connected split-field type. The relays A and B may be controlled in the manner disclosed in Fig. 3 to connect the motor 50 with the source E of direct current. Each time that relay A is operated while relay B is unoperated, a circuit is established from the positive terminal of the source E, over the back contact of relay B, over the front contact of relay A and through the field winding 51 and armature circuit of motor 50 in series to the negative terminal of the source E whereupon the motor 50 will be operated in one direction of rotation and at a speed which is determined by the duration of the periods during which relay A is operated. On the other hand, each time that relay B is operated while relay A is unoperated a circuit is established from the positive terminal of the source E, over the back contact of relay A, over the front contact of relay B and through the field winding 52 and armature circuit of motor 50 in series to the negative terminal of the source E whereupon the motor 50 will be operated in the reverse direction of rotation and at a speed which is determined by the duration of the periods during which relay B is operated.

Fig. 5 shows a further application of the fundamental circuit of Fig. 1 to the control of an alternating current motor of the two phase type. In this circuit a direct current signal input is applied between the input terminals 10 and 11 and from such terminals is applied to the control grids 12 and 13 of the dual amplifier tube AMP. The grids of this tube are also connected through equal resistances 26 and 27 and through the bias adjusting rheostat 28 to ground. The cathodes 18 and 19 are interconnected by the winding of rheostat 20, the slider of which is connected to ground through the rheostat 28. By adjusting the rneostat 20 a balanced condition of the two units of the tube may be secured when no signal input is present between the terminals 10 and 11. The plates 16 and 17 are connected respectively through the high resistance biasing windings H of relay A' and B' to a source DC of positive direct current which may, for example, having a potential of 300 volts. The low resistance windings L of relays A' and B' are connected in parallel across the terminals of the source AC of alternating current which may, for example, be of 12 volts, 60 cycles. The high resistance winding of each relay may, for example, be of 2300 ohms resistance and the low resistance winding may be of 700 ohms resistance.

The motor 30 is of the two-phase type one phase winding 31 being excited from the phase $\varphi_1$ of the two phase alternating current source AC' and the other phase winding 32 being excitable under the control of relays A' and B' and therefore connected between the swing contacts of such relays. The same relay contact protection is provided as is disclosed in Fig. 4.

With no signal present both units of tube AMP are conductive to an equal degree and the same value of direct biasing current is applied from the source DC through the H windings of the relays. With the L windings of the relay periodically excited from the 60 cycle source AC of alternating current, the relays will become energized in the manner disclosed in Fig. 8—A and will operate together during each positive half wave of the summation currents C and release together during each negative half wave of the summation currents. As a consequence the vibratory operation of relays A' and B' is ineffective to connect current from the phase $\varphi_2$ of the source AC' through the winding 32 of the motor and the motor will therefore not operate.

If, however, a direct current signal input is applied across the input terminals 10 and 11, such that the upper unit of tube AMP becomes more conductive and the lower unit of tube AMP becomes less conductive, the biasing current applied from the source DC through the H winding of relay A' will be increased and the biasing current applied through the H winding of relay B' will be decreased in the manner illustrated in Fig. 8—B with the result that twice during each positive half cycle of the source AC an impulse of alternating current from phase $\varphi_2$ of the source AC' is transmitted through the phase winding 32 of the motor 30. These impulses will be so poled with respect to the phase $\varphi_1$ potential applied to the phase winding 31 of the motor that the motor will rotate in a definite direction and at a speed which is determined by the duration of the impulses applied to the phase winding 32, or proportional to the magnitude of the input signal.

If the signal input to the terminals 10 and 11 is of the opposite polarity, then the upper unit of tube AMP will become less conductive and the lower unit of the tube more conductive, thereby causing the biasing current applied to the H winding of relay A' to decrease and the biasing current applied to the H winding of relay B' to increase as illustrated in Fig. 8—C with the result that twice during each positive half cycle of the source AC an impulse of alternating current from phase $\varphi_2$ of the source AC' is transmitted through the phase winding 32 of the motor 30. These impulses will be of a duration which is proportional to the magnitude of the input signal and in a direction opposite to that previously described so that the motor 30 will now run in the opposite direction at a speed proportional to the magnitude of the input signal.

Fig. 6 shows a further application of the fundamental circuit of Fig. 1 to the control of an alternating current motor of the split phase type. The relays A and B may be controlled in the manner disclosed in Fig. 3 to connect the motor 53 with the source of single phase alternating current. Each time that relay A is operated while relay B is unoperated a circuit is established from the terminal 57 of the source, over the back contact of relay B, over the front contact of relay A and through one phase winding 54 of the motor 53 and in parallel through condenser 56 and the other phase winding 55 of the motor to the terminal 58 whereupon the motor 53 will be operated in one direction of rotation and at a speed which is determined by the duration of the periods during which relay A is operated. On the other hand, each time that relay B is operated while relay A is unoperated, a circuit is established from the terminal 57 of the source over the back contact of relay A, over the front contact of relay B, through one phase winding 55 of the motor and in parallel therewith through condenser 56 and the other phase winding 54 of the motor to power terminal 58 whereupon the motor 53 will be operated in the reverse direction of rotation and at a speed which is determined by the duration of the periods during which relay B is operated.

Fig. 7 discloses an application of the fundamental circuit of Fig. 2 to the control of an alternating current motor. In this circuit a direct current signal input is superimposed upon a normal direct current bias and applied across the terminals 40 and 41. This superimposed current could be applied from the output of an amplifier tube. The high resistance windings H of relays A' and B' are connected in series between the terminals 40 and 41 and the low resistance windings L are connected to phase $\varphi_2$ of the two phase alternating current source AC'. One phase winding 31 of the two phase alternating current motor 30 is connected to phase $\varphi_1$ of the source AC' and the other phase winding 32 is connected between the swing contacts of relays A' and B'.

With only the normal direct current bias connected to the H windings of relays A' and B', that is, when no signal input is being received and the L winding so connected to the phase φ2 of the source AC' that the relays A' and B' operate and release in alternation, the relays will function in the manner disclosed in Fig. 9—A so that during the entire period that relay A' is operated, relay B' is released and vice versa. Under this condition with relay A' operated and relay B' released, a circuit is established from terminal 42 of phase φ2 of source AC', over the back contact of relay B', through phase widing 32 of the motor 30 and over the front contact of relay A' to terminal 42 and with relay A' released and relay B' operated a circuit is established from terminal 43 of phase φ2 of source AC', over the back contact of relay A', through the winding 32 of motor 30 and over the front contact of relay B' to terminal 43. No potential is therefore applied to the motor winding 32 at any time and the motor does not therefore operate.

If the direct current signal input across terminals 40 and 41 is increased so that the current applied through the H windings of relays A' and B' increases as illustrated in Fig. 9—B, the periods during which the relay A' remains operated will be lengthened and at the same time the periods during which relay B' remains released are shortened and also the periods during which relay A' remains released will be shortened and at the same time the periods during which relay B' remains operated are lengthened. Since the relays A' and B' operate and release in alternation, there are two periods during each full wave cycle of the alternating current source when both relays are operated such periods having durations dependent upon the magnitude of the signal input. During each period that both relays are operated, a circuit is established from terminal 42 of the phase φ2 of source AC', over the front contact of relay A', through the phase winding 32 of the motor 30 and over the front contact of relay B' to terminal 43. These impulses will be so poled with respect to the phase φ2 potential applied to the phase windings 31 and the motor that the motor will rotate in a definite direction and at a speed which is determined by the duration of the impulses applied to the phase winding 32 or proportional to the magnitude of the input signal.

If the signal input to the terminals 40 and 41 is of the opposite polarity so that the current applied through the H windings of relays A' and B' decreases as illustrated in Fig. 9—C, then the periods during which relay A' remains operated will be shortened and at the same time the periods during which relay B' remains released will be lengthened and also the periods during which relay A' remains released will be lengthened and at the same time the periods during which relay B' remains operated will be shortened. Since the relays A' and B' operate and release in alternation, there are two periods during each full cycle of the alternating current when both relays are released, such periods having durations dependent upon the magnitude of the signal input. During each period that both relays are released a circuit is established from terminal 42 of phase φ2 of the source AC', over the back contact of relay B', through the phase winding 32 of the motor 30 and over the back contact of relay A' to terminal 43. These impulses will be so poled with respect to the phase φ1 potential applied to the phase winding 31 of the motor that the motor will run in the opposite direction at a speed proportional to the magnitude of the input signal.

While the circuit of Fig. 7 has been shown as applied to the control of a two-phase alternating current motor, it will be apparent that it could be applied to the control of an alternating current motor of the type shown in Fig. 6 or of a direct current motor of the type shown in Fig. 3 in which case the field winding of the motor would be excited from a direct current source and the armature circuit of the motor would be energized from the direct current source under the control of relays A' and B' in a manner similar to that disclosed in Fig. 3 with the difference, however, that with one relay operated and the other relay released, no circuit would be effective for applying power to the armature circuit of the motor. The circuit of Fig. 7 could also be adapted to the control of a motor of the direct current type disclosed in Fig. 6.

In the circuits hereinbefore discussed the relays are excited from a source of invariable alternating current and a source of fixed biasing current and are controlled in response to a control signal by a variable direct current bias. An alternative method of controlling the relays is by varying the phase relationship of the alternating current excitations of the two relays in response to a control signal while maintaining a fixed direct current bias of the relays. This method of control is schematically illustrated in Fig. 10. As disclosed in this figure, the relays are equally biased in a positive direction from the biasing battery $B_1$, the winding of relay A is excited from the source of alternating current $AC_1$ and the winding of relay B is excited from the source $AC_2$ so that with no control signal applied between the input terminals 10 and 11 relays A and B will operate and release together. A source of isochronous alternating current $AC_3$, variable in magnitude in accordance with a control signal, is applicable across the input terminals 10 and 11. As the magnitude of the source $AC_3$ is varied a shift of the phase of the total alternating current applied to the relay windings is caused whereby the operation of one relay is advanced with respect to the other relays, the amount of the advance being dependent upon the magnitude of the signal.

Relays A and B may connect one phase winding of a two phase alternating current motor 63 to the terminals 61 and 62 of a source of direct current whereby the motor may be operated in one or the other direction of rotation as disclosed in Fig. 10 or the relays may connect a series-connected split field direct current motor with a source of alternating current as disclosed in Fig. 11.

Considering first the operation of the circuit of Fig. 10 it will be assumed that no signal is present and that in the no-signal condition that the phase components of the source AC applied to the windings of relays A and B are coincident as illustrated in Fig. 12—A. Since the alternating control currents applied to the two relays are similarly phased and the direct current biases applied to the two relays from the battery $B_1$ are the same, relay A operates when the summation current $S_A$ rises to the operate value OP for relay A as illustrated in the upper portion of Fig. 12—A and releases when the summation current falls to the release value REL for such relay. The sections O of the curve O—R now represent periods during which relay A is operated and sections R represent periods during which relay A is released.

The same is true for relay B as disclosed in the lower portion of Fig. 12—A. It will be noted that the O and R sections of the curves O—R are equal in length and that during the periods O when relay A is operated, relay B is also operated and vice versa, and as a consequence no power circuit will be established for the motor 63 since power can flow from the source of direct current connected between the terminals 61 and 62 only when one relay is operated and the other relay is released. The zero power output condition is represented by the line P interposed between the upper and lower portions of Fig. 12—A.

If the control signal causes the alternating current applied to the winding of relay B to lag behind the alternating current applied to the winding of relay A, the summation current $S_B$ will lag behind the summation current $S_A$ as illustrated in Fig. 12B and, as a consequence, there will be an interval after relay A operates during each positive half cycle of the summation current $S_A$ before relay B operates and current will flow from the terminal 61 of the direct current source up through the phase winding 64 of motor 63 to the terminal 62 and also there will be a following period after relay A releases and before relay B releases when current will flow from the terminal 61 down through the phase winding 64 of the motor to the terminal 62. These impulses are represented by the curve P interposed between the upper and lower portions of Fig. 12—B. It will be noted that they are of equal duration and of opposite polarity and have the same effect upon the phase winding 64 of the motor 63 as an alternating current. If the other phase winding 65 of the motor is now energized from an alternating current scource in phase agreement with the average motion of the relays in order to be in quadrature with the driving current through the winding 64, the motor will rotate in one direction at a speed determined by the length of the impulses delivered to the winding 64.

If the control signal causes the alternating current applied to the winding of relay B to lead the alternating current applied to the winding of relay A, the summation current $S_B$ will lead the summation current $S_A$ as illustrated in Fig. 12—C and, as a consequence, there will be an interval after relay B operates during each positive half cycle of the summation current $S_B$ before relay A operates when current will flow from terminal 61 of the source of direct current down through the phase winding 64 of the motor to the terminal 62 and also there will be a following interval after relay B releases and before relay A releases when current will flow from the terminal 61 up through the winding 64 of the motor to terminal 62. These impulses are represented by the curve P interposed between the upper and lower portions of Fig. 12—C. It will be noted that these impulses are oppositely poled from those disclosed in Fig. 12—B and therefore the motor 63 will be operated in a reverse direction. The length of the impulses will depend upon the lead or lag of the summation current $S_B$ with respect to the summation current $S_A$ and the speed of the motor will depend upon the length of the impulses.

It is to be noted that with the circuit of Fig. 10 it is possible to generate an alternating current from a direct current source, the phasing of which is in quadrature with the average phase of the relay operation and may be reversed by the alteration of the direction of the change of the control signal either side of the normal zero condition.

A direct current motor 66 may be controlled by the relays A and B of Fig. 10 by connecting the field windings 67 and 68 of the motor to the front contacts of the relays as shown in Fig. 11 and by connecting the terminals 69 and 70 to a source of alternating current which is in quadrature phase relationship to the alternating current which drives the relay A.

What is claimed is:

1. In an amplifier circuit, two relays, means for applying a current of varying amplitude to the windings of said relays whereby said relays are caused to periodically operate in alternation in accordance with the periodicity of said current, an input circuit for applying a variable control current to the windings of said relays, a source of power, a load device, and means controlled by said relays for applying power from said source to said load device, the energization of the windings of said relays by said control current being effective to control the relationship between the operated periods of said relays whereby the direction of the impulses transmitted from said source to said load device is made dependent upon the direction of the control current and the duration of each impulse is made dependent upon the magnitude of the control current.

2. In an amplifier circuit, two relays, means for applying a current of varying amplitude to the windings of said relays whereby said relays are caused to periodically operate in unison in accordance with the periodicity of said current, an input circuit for applying a variable control current to the windings of said relays, a source of power, a reversible motor, and means controlled by said relays for applying power from said source to said motor, the energization of the windings of said relays by said control current being effective to control the relationship between the operated periods of said relays whereby the direction of the impulses transmitted from said source to said motor is made dependent upon the direction of the control current and the duration of each impulse is made dependent upon the magnitude of the control current.

3. In an amplifier circuit, two relays, means for applying a current of varying amplitude to the windings of said relays whereby said relays are caused to periodically operate in unison in accordance with the periodicity of said current, an input circuit for applying a variable control current to the windings of said relays, a source of direct current, a reversible direct current motor having its field winding excited from said source of direct current, and circuits controlled by said relays for connecting said source to the armature circuit of said motor whereby said motor is caused to run in one or the other direction of rotation, the energization of the windings of said relays by said control current being effective to control the relationship between the operated periods of said relays whereby the direction of the impulses transmitted from said source through the armature circuit of said motor is made dependent upon the direction of the control current and the duration of each impulse is made dependent upon the amount of the control current.

4. In an amplifier circuit, two relays, means for applying a current of varying amplitude to the windings of said relays whereby said relays are caused to periodically operate in unison in accordance with the periodicity of said current, an input circuit for applying a variable control current to the windings of said relays, a source of two phase alternating current, a reversible two phase alternating current motor one phase winding of which is energized from one phase of said source and the other phase winding of which is energizable from the other phase of said source under the control of said relays, and circuits controlled by said relays for connecting the second phase of said source to said second phase winding in a leading or a lagging phase relationship with respect to the energization of said first phase winding, the energization of the windings of said relays by said control current being effective to control the relationship between the operated periods of said relays whereby the direction of the phase shift of the power applied to the second phase winding of said motor is made dependent upon the direction of the control current and the duration of each impulse is applied to the second phase winding of said motor is made dependent upon the magnitude of the control current.

5. In an amplifier circuit, an amplifier stage comprising two amplifier tube units connected in a push-pull relationship, a relay stage comprising two relays, the windings of which are connected respectively into the output circuits of said amplifier tube units, a motor stage comprising a reversible direct current motor, means for applying a current of varying amplitude to the windings of said relays whereby said relays are caused to periodically operate in unison in accordance with the periodicity of said current, an input circuit for applying an input signal which varies in polarity and in magnitude to the input circuit of said amplifier tube units whereby amplified control currents varying in magnitude are applied from the output circuit of said tube units to the windings of said relays, a source of direct current, a circuit for exciting the field of said motor from said source, and circuits controlled by said relays for connecting said source to the armature circuit of said motor whereby said motor is caused to run in one or the other direction of rotation, the energization of the windings of said relays by said control current being effective to shift the phase relationship between the operated periods of said relays whereby the direction of the impulses transmitted from said source through the armature circuit of said motor is made dependent upon the polarity of the input signal and the duration of each impulse is made dependent upon the magnitude of the input signal.

6. In an amplifier circuit, two relays, means for applying a current of varying amplitude to the windings of said relays whereby said relays are caused to periodically operate in alternation in accordance with the periodicity of said current, an input circuit for applying a variable control current to the windings of said relays, a source of power, a reversible motor and circuits extending serially over the contacts of said relays for applying power from said source to said motor, the energization of the windings of said relays by said control current being effective to control the relationship between the operated periods of said relays whereby the direction of the impulses transmitted from said source to said motor is made dependent upon the direction of the control current and the duration of each impulse is made dependent upon the magnitude of the control current.

7. In an amplifier circuit two relays, means for applying a current of varying amplitude to the windings of said relays whereby said relays are caused to periodically operate in alternation in accordance with the periodicity of said current, an input circuit for applying a control current to the windings of said relays which varies in direction and magnitude, a source of two phase alternating current, a reversible two phase alternating current motor one phase winding of which is energized from one phase of said source and the other phase winding of which is energizable from the other phase of said source under the control of said relays, and circuits controlled by said relays for connecting the second phase of said source to said second phase winding of said motor in a leading or lagging phase relationship with respect to the energization of the first phase winding of said motor, the energization of the windings of said relays of said control current being effective to control the relationship between the operated periods of said relays whereby the direction of the phase shift of power applied to the second phase winding of said motor is made dependent upon the direction of the control current and the duration of each impulse applied to the second phase winding of said motor is made dependent upon the magnitude of the control current.

8. In an amplifier circuit, two relays, means for applying a normal biasing current to the windings of said relays, means for applying a current of varying amplitude to the windings of said relays whereby said relays are caused to periodically operate in alternation in accordance with the periodicity of said current and with equal operate and release times, means for increasing the biasing current applied to the windings of said relays, a source of power, a reversible motor, and means controlled by said relays for applying power from said source to said motor, the increase of the biasing current applied to the windings of said relays being effective to lengthen the operated periods of said relays whereby said relays are caused to be concurrently operated for intervals dependent upon the magnitude of the increase of the biasing current to cause said motor to run in one direction of rotation at a speed proportional to the increase in biasing current.

9. In an amplifier circuit, two relays, means for applying a normal biasing current to the windings of said relays, means for applying a current of varying amplitude to the windings of said relays whereby said relays are caused to periodically operate in alternation in accordance with the periodicity of said current and with equal operate and release times, means for decreasing the biasing current applied to the windings of said relays, a source of power, a reversible motor, and means controlled by said relays for applying power from said source to said motor, the decrease of the biasing current applied to the windings of said relays being effective to shorten the operated periods of said relays whereby said relays are caused to be concurrently released for intervals dependent upon the magnitude of the decrease of the biasing current to cause said motor to run in a reverse direction of rotation at a speed proportional to the decrease in biasing current.

10. In an amplifier circuit, two relays, means for applying a normal biasing current to the windings of said relays, means for applying a current of varying amplitude to the windings of said relays whereby said relays are caused to periodically operate in unison in accordance with the periodicity of said current and with equal operate and release times, means for increasing or decreasing said normal biasing current whereby, the operate time of one of said relays is increased and the concurrent operate time of the other of said relays is decreased, a source of power, a reversible motor, and means controlled by said relays for applying power from said source to said motor in a direction dependent upon which of said relays has had its operated period lengthened and for intervals dependent upon the difference in the concurrent operating times of said relays, whereby said motor is caused to run in a direction of rotation dependent upon the direction of change of the biasing current and at a speed proportional to the magnitude of the change in the biasing current.

11. In an amplifier circuit, two relays, means for applying a normal biasing current to the windings of said relays, means for applying alternating control currents to the windings of said relays whereby said relays are caused to periodically operate and release, means for shifting the phase relationship between the alternating currents applied to the windings of said relays, a source of power, a reversible motor, and means controlled by said relays for applying power from said source to said motor, the shifting of the phase relationship between the alternating currents applied to the windings of said relays being effective to shift the phase relationship between the operated periods of said relays whereby the direction of rotation of said motor is made dependent upon whether the operation of one of said relays is made to lead or lag the operation of the other of said relays and whereby the duration of each impulse and therefore the speed of the motor is made dependent upon the amount of the lead or lag.

12. In an amplifier circuit, two relays, means for applying a normal biasing current to the windings of said relays, means for applying alternating control currents to the windings of said relays whereby said relays are caused to periodically operate and release, means for shifting the phase relationship between the alternating currents applied to the windings of said relays, a source of direct current, a reversible alternating current motor and circuits controlled by said relay for applying impulses from said source to said motor, the shifting of the phase relationship between the alternating currents applied to the windings of said relays being effective to shift the phase relationship between the operated periods of said relays whereby the direction of rotation of said motor is made dependent upon whether the operation of one of said relays is made to lead or lag the operation of the other of said relays and whereby the duration of each impulse and therefore the speed of the motor is made dependent upon the amount of the lead or lag.

13. In an amplifier circuit, two relays each having a movable contact, a front contact and a back contact, a source of periodically variable control current, a source of variable control current, means for applying variable control currents from said sources to the windings of said relays whereby said relays are caused to periodically operate and release, a load device connected between the movable contacts of said relays, a source of power the terminals of which are connected to front and back contacts of said relays, said connections between said load device, said source of power and said relay contacts constituting two circuits extendible serially over contacts of both of said relays for applying power from said power source to said load device, the energization of the windings of said relays by said control currents being effective to control the relationship between the operated periods of said relays whereby the direction and duration of the impulses transmitted from said power source to said load device is made dependent upon the relative magnitudes of the control currents.

14. In an amplifier circuit, two relays each having a movable contact, a front contact and a back contact, a source of periodically variable current, a source of variable control current, means for applying variable control currents from said sources to the windings of said relays whereby said relays are caused to periodically operate and release, a reversible motor connected between the movable contacts of said relays, a source of power the terminals of which are connected to front and back contacts of said relays, said connections between said motor, said source of power and said relay contacts constituting two circuits extendible serially over contacts of both of said relays for applying power from said power source to said motor, the energization of the windings of said relays by said control currents being effective to control the relationship between the operated periods of said relays whereby the direction and duration of the impulses transmitted from said power source through said motor is made dependent upon the relative magnitudes of the control currents.

15. In an amplifier circuit, two relays each having a movable contact, a front contact and a back contact, a source of periodically variable current, a source of variable control current, means for applying summation control currents of varying amplitude from said sources to the windings of said relays whereby said relays are caused to periodically operate in accordance with the periodicity of said currents, a source of signaling current for controlling said means, a load device connected between the movable contacts of said relays, a source of power the terminals of which are connected to front and back contacts of said relays, said connections between said load device, said source of power and said relay contacts constituting two circuits extendible serially over contacts of both of said relays for applying power from said power source to said load device, the energization of the windings of said relays by said summation control currents being effective to control the relationship between the operated periods of said relays, whereby the direction of the impulses transmitted from the power source to said load device is made dependent upon the direction of the input control current and the duration of each impulse is made dependent upon the magnitude of the input control current.

JOHN T. L. BROWN.
CHARLES E. POLLARD, Jr.

REFERENCES CITED

The following references are of record in the file of this patent:

UNITED STATES PATENTS

| Number | Name | Date |
|---|---|---|
| 1,942,587 | Whitman | Jan. 9, 1934 |
| 2,066,760 | Blamberg | Jan. 5, 1937 |
| 2,134,901 | Wey | Nov. 1, 1938 |
| 2,136,809 | Uehling | Nov. 15, 1938 |
| 2,273,532 | Lovell | Feb. 17, 1942 |
| 2,330,427 | Hornfleck | Sept. 28, 1943 |